_United States Patent Office_

3,121,726
Patented Feb. 18, 1964

3,121,726
PROCESS FOR THE PREPARATION OF 2-ACYLHY-
DRAZINO-5-NITROSOTROPONE DERIVATIVES
Genshun Sunagawa, Masao Arakawa, Yasunobu Sato, and
Haruhiko Minakami, all of Shinagawa-ku, Tokyo,
Japan, assignors to Sankyo Company, Limited, Tokyo,
Japan
No Drawing. Filed Dec. 11, 1961, Ser. No. 158,558
Claims priority, application Japan Dec. 17, 1960
6 Claims. (Cl. 260—295)

This invention relates to 2-acylhydrazino-5-nitrosotropone derivatives and process for preparing thereof. More particularly, it relates to new 2-acylhydrazino-5-nitrosotropone derivatives having the formula:

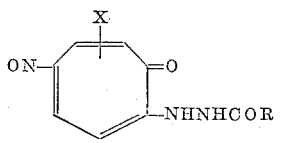

and process for preparing thereof.

In the formula mentioned above, X is a member selected from the group consisting of hydrogen, halogen such as chlorine or bromine, lower alkyl group such as methyl or ethyl, lower alkoxy group such as methoxy or ethoxy, aryl group such as phenyl, aryloxy group such as phenoxy and acylamino group such as formylamino. R is a member selected from the group consisting of hydrogen, unsubstituted or substituted alkyl group such as methyl, propyl, isobutyl, heptyl, octyl, phenoxymethyl, p-nitrobenzyl or α-hydroxyethyl, unsubstituted or substituted aryl group such as phenyl, p-nitrophenyl, p-chlorophenyl, tolyl, anisyl or p-dimethylaminophenyl and unsubstituted or substituted heterocyclic group such as 2-pyridyl, 3-pyridyl, 4-pyridyl, pyrazinyl, 5-nitro-2-furyl, 2-indolyl, 4-pyridyl N-oxide

or 4-pyridyl 1-methyl nitrate

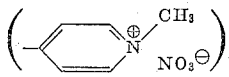

The 2-acylhydrazino-5-nitrosotropone derivatives of this invention exist in tautomerism between forms

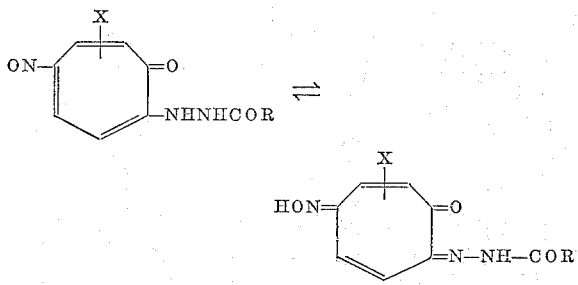

The above-mentioned 2-acylhydrazino-5-nitrosotropone derivatives of this invention are new compounds possessing potent antimicrobial activities. For example, 2-isonicotinoylhydrazino-5-nitrosotropone of this invention completely inhibits growth of _Micrococcus tuberculosis_ cultivated on Kirchner medium at a concentration of 0.78 mcg./ml. They are therapeutically useful in view of their low toxicities.

It is an object of this invention to provide novel group of compounds of therapeutic use as described above. It is another object of this invention to provide process for preparing such compounds. Other objects of this invention will be apparent hereinafter.

According to the present invention, 2-acylhydrazino-5-nitrosotropone derivatives having the Formula I mentioned above are prepared by reacting 5-nitrosotropolone derivatives having the formula:

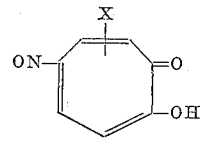

wherein X has the meanings given above with carboxylic acid hydrazides having the formula:

NH$_2$—NH—COR wherein R has the meanings given above.

In carrying out the process according to the present invention, the reaction is preferably effected by heating the reactants in an inert aqueous or non-aqueous organic solvent such as methanol, aqueous methanol, ethanol or aqueous ethanol for about 5 to 15 minutes. After completion of the reaction, the reaction product is isolated from the reaction mixture by one of the conventional procedures. For example, after completion of the reaction, the reaction mixture is cooled and the precipitated product is recovered by filtration. Alternatively, after completion of the reaction, the reaction mixture is concentrated under reduced pressure, the concentrated mixture is cooled and then the precipitated product is recovered by filtration.

As compounds used as carboxylic acid hydrazide in the process according to the present invention, there may be mentioned formic acid hydrazide, acetic acid hydrazide, n-butyric acid hydrazide, iso-valeric acid hydrazide, n-octanoic acid hydrazide, n-nonanoic acid hydrazide, p-nitrophenylacetic acid hydrazide, lactic acid hydrazide, phenoxyacetic acid hydrazide, benzoic acid hydrazide, p-nitrobenzoic acid hydrazide, p-toluic acid hydrazide, p-anisic acid hydrazide, p-dimethyl aminobenzoic acid hydrazide, isonicotinic acid hydrazide, nicotinic acid hydrazide, picolinic acid hydrazide, pyrazinoic acid hydrazide, 5-nitro-2-furoic acid hydrazide, indole-2-carboxylic acid hydrazide, isonicotinic acid hydrazide N-oxide and isonicotinic acid hydrazide 1-methyl nitrate.

As compounds used as 5-nitrosotropolone derivatives mentioned above there may be mentioned 5-nitrosotropolone, 3-bromo-5-nitrosotropolone, 3-phenyl-5-nitrosotropolone and 3-methyl-5-nitrosotropolone.

Representative of the 2-acylhydrazino-5-nitrosotropone derivatives obtained by the process according to the present invention are 2-formyl hydrazino-5-nitrosotropone, 2-acetyl hydrazino-5-nitrosotropone, 2-butyroyl hydrazino-5-nitrosotropone, 2-iso-valeroyl hydrazino-5-nitrosotropone, 2-n-octanoyl hydrazino-5-nitrosotropone, 2-n-nonanoyl hydrazino - 5 - nitrosotropone, 2-p-nitrophenylacetyl hydrazino-5-nitrosotropone, 2-lactoyl hydrazino-5-nitrosotropone, 2-p-dimethyl aminobenzoylhydrazino-5-nitrosotropone, 2-phenoxy acetylhydrazino-5-nitrosotropone, 2-benzoylhydrazino - 5 - nitrosotropone, 2-p-nitrobenzoylhydrazino-5 - nitrosotropone, 2-p-toluoyl hydrazino - 5 - nitrosotropone, 2 - p - anisoylhydrazino-5-nitrosotropone, 2 - p - dimethylaminobenzoylhydrazino-5-nitrosotropone, 2-isonicotinoylhydrazino - 5 - nitrosotropone, 2 - nicotinoylhydrazino - 5 - nitrosotropone, 2-picolinoyl hydrazino-5-nitrosotropone, 2-pyrazinoylhydrazino-5-nitrosotropone, 2-(5-nitro-2-furoyl) hydrazino-5-nitrosotropone, 2-indolylcarbonylhydrazino-5-nitrosotropone, 2 - isonicotinoylhydrazino - 5 - nitrosotropone N-oxide, 2-isonicotinoylhydrazino-5-nitrosotropone 1-methyl nitrate, 2-benzoylhydrazino - 5 - nitroso - 7 - bromotropone, 2-benzoylhydrazino-5-nitroso-7-phenyltropone and 2-anisoylhydrazino-5-nitroso-7-methyltropone.

The following examples illustrate methods of carrying out the present invention, but it is to be understood that these examples are given by way of illustration and not of limitation.

EXAMPLE 1

*Preparation of 2-Benzoylhydrazino-5-Nitrosotropone*

To a hot solution of 300 mg. of 5-nitrosotropolone in 30 ml. of ethanol is added a solution of 280 mg. of benzoic acid hydrazide dissolved in 20 ml. of 60% aqueous ethanol. The resulting mixture is boiled for about 5 minutes. After completion of the reaction, the reaction mixture is concentrated under reduced pressure to crystallize orange yellow crystals. The product is recrystallized from 85% aqueous ethanol to give orange yellow needles, M.P. 192–193° C. (with decomposition).

*Analysis.*—Calc'd for $C_{14}H_{11}N_3O_3$: C, 62.45; H, 4.12; N. 15.61. Found: C, 62.04; H, 4.25; N, 15.66.

It is easily soluble in alkaline aqueous solution and sparingly soluble in water.

U.V. spectrum: $\lambda_{max.}^{EtOH}$ 226.5 m$\mu$ (log $\epsilon$ 4.26); 280 m$\mu$ (log $\epsilon$ 4.16); 396 m$\mu$ (log $\epsilon$ 4.27)

EXAMPLE 2

*2-p-Nitrobenzoylhydrazino-5-Nitrosotropone*

The procedure of Example 1 is repeated except that 405 mg. of p-nitrobenzoic acid hydrazide is used instead of benzoic acid hydrazide. The resulting product is dissolved in hot pyridine, water is added to the solution and the precipitate thus formed is filtered to obtain 300 mg. of orange yellow microcrystals decomposing at 199–200° C.

*Analysis.*—Calc'd for $C_{19}H_{15}O_5N_5$: C, 58.01; H, 3.84; N, 17.87. Found: C, 58.10; H, 3.87; N, 17.63.

U.V. spectrum: $\lambda_{max.}^{EtOH}$ 246 m$\mu$ (log $\epsilon$ 4.44); 396 m$\mu$ (log $\epsilon$ 4.34); 535 m$\mu$ (log $\epsilon$ 4.07); 565 m$\mu$ (log $\epsilon$ 4.04) shoulder

EXAMPLE 3

*2-p-Toluoylhydrazino-5-Nitrosotropone*

The procedure of Example 1 is repeated except that 330 mg. of p-methylbenzoic acid hydrazide is used instead of benzoic acid hydrazide. The product thus obtained is recrystallized from aqueous dioxane to obtain 172 mg. of orange needles decomposing at 219–220° C.

*Analysis.*—Calc'd for $C_{15}H_{13}O_3N_2$: C, 63.59; H, 4.63; N, 14.83. Found: C, 63.69; H, 4.64; N, 14.97.

U.V. spectrum: $\lambda_{max.}^{EtOH}$ 232 m$\mu$ (log $\epsilon$ 4.37); 396 m$\mu$ (log $\epsilon$ 4.36)

EXAMPLE 4

*2-p-Anisoylhydrazino-5-Nitrosotropone*

To a hot solution of 300 mg. of 5-nitrosotropolone in 30 ml. of ethanol is added a solution of 370 mg. of p-anisic acid hydrazide dissolved in 15 ml. of ethanol. The resulting mixture is boiled for 15 minutes. After completion of the reaction, the reaction mixture is cooled to room temperature and the crystals thus separated are recrystallized from dioxane to obtain orange yellow microcrystals decomposing at 230–231° C.

*Analysis.*—Calc'd for $C_{15}H_{13}O_4N_3$: C, 60.19; H, 4.38; N, 14.04. Found: C, 60.54; H, 4.24; N, 13.91.

U.V. spectrum: $\lambda_{max.}^{EtOH}$ 25.35 m$\mu$ (log $\epsilon$ 4.34); 400 m$\mu$ (log $\epsilon$ 4.48)

EXAMPLE 5

*2-p-Nitrophenylacetylhydrazino-5-Nitrosotropone*

The procedure of Example 4 is repeated except that 500 mg. of p-nitrophenylacetic acid hydrazide is used instead of p-anisic acid hydrazide. The product thus obtained is recrystallized from aqueous dioxane to obtain 250 mg. of yellow scaly crystals decomposing at 212° C.

*Analysis.*—Calc'd for $C_{15}H_{12}O_5N_4$: C, 54.88; H, 3.68; N, 17.07. Found: C, 54.81; H, 3.74; N, 16.81.

U.V. spectrum: $\lambda_{max.}^{EtOH}$ 271 m$\mu$ (log $\epsilon$ 4.45); 382 m$\mu$ (log $\epsilon$ 4.16)

EXAMPLE 6

*2-p-Dimethylaminobenzoylhydrazino-5-Nitrosotropone*

The procedure of Example 4 is repeated except that 350 mg. of p-dimethylaminobenzoic acid hydrazide is used instead of p-anisic acid hydrazide. The resulting product is recrystallized from dioxane to obtain 500 mg. of reddish violet needles decomposing at 212–222° C.

*Analysis.*—Calc'd for $C_{16}H_{16}O_3N_4$: C, 60.63; H, 5.16; N, 17.94. Found: C, 60.24; H, 5.47; N, 17.27.

EXAMPLE 7

*2-Isonicotinoylhydrazino-5-Nitrosotropone*

To a hot solution of 600 mg. of 5-nitrosotropolone in 60 ml. of ethanol is added a solution of 560 mg. of isonicotinic acid hydrazide dissolved in 12 ml. of ethanol and the resulting mixture is boiled for 10 minutes. After completion of the reaction, the reaction mixture is cooled to crystallize orange crystals decomposing at 242–243° C.

*Analysis.*—Calc'd for $C_{13}H_{10}N_4O_3$: C, 57.77; H, 3.73; N, 20.73. Found: C, 58.05; H, 3.57; N, 20.87.

U.V. spectrum: $\lambda_{max.}^{EtOH}$ 266 m$\mu$ (log $\epsilon$ 4.20); 425 m$\mu$ (log $\epsilon$ 3.95)

The product is sparingly soluble in water and ethanol and is easily soluble in alkaline aqueous solution.

EXAMPLE 8

*2-Nicotinoylhydrazino-5-Nitrosotropone*

The procedure of Example 7 is repeated except that the same amount of nicotinic acid hydrazide is used instead of isonicotinic acid hydrazide to obtain 250 mg. of orange microcrystals decomposing at 230–231° C.

*Analysis.*—Calc'd for $C_{13}H_{10}O_3N_4$: C, 57.77; H, 3.73; N, 20.73. Found: C, 57.78; H, 3.95; N, 20.60.

U.V. spectrum: $\lambda_{max.}^{EtOH}$ 269 m$\mu$ (log $\epsilon$ 4.14); 394 m$\mu$ (log $\epsilon$ 4.19); 545 m$\mu$ (log $\epsilon$ 4.98)

EXAMPLE 9

*2-Picolinoylhydrazino-5-Nitrosotropone*

The procedure of Example 7 is repeated except that the same amount of picolinic acid hydrazide is used instead of isonicotinic acid hydrazide. The product thus formed is recrystallized from dioxane to obtain 250 mg. of yellow crystals decomposing at 225° C.

*Analysis.*—Calc'd for $C_{13}H_{10}O_3N_4$: C, 57.77; H, 3.73; N, 20.73. Found: C, 57.77; H, 3.53; N, 20.81.

U.V. spectrum: $\lambda_{max.}^{EtOH}$ 270 m$\mu$ (log $\epsilon$ 4.18); 392 m$\mu$ (log $\epsilon$ 4.32)

EXAMPLE 10

*2-Pyrazinoylhydrazino-5-Nitrosotropone*

The procedure of Example 7 is repeated except that 310 mg. of pyrazinoic acid hydrazide is used instead of isonicotinic acid hydrazide to obtain 240 mg. of yellow microcrystals decomposing at 255° C.

*Analysis.*—Calc'd for $C_{12}H_9O_3N_5$: C, 53.14; H, 3.34; N, 25.82. Found: C, 53.42; H, 3.50; N, 25.94.

U.V. spectrum: $\lambda_{max.}^{EtOH}$ 268 m$\mu$ (log $\epsilon$ 4.30); 392 m$\mu$ (log $\epsilon$ 4.32)

EXAMPLE 11

*2-Isonicotinoylhydrazino-5-Nitrosotropone N-oxide*

To a hot solution of 600 mg. of 5-nitrosotropolone in 60 ml. of ethanol is added a solution of 600 mg. of isonicotinic acid hydrazide N-oxide dissolved in 20 ml. of water and the mixture is boiled on water bath for 10 minutes. After completion of the reaction, the reaction mixture is cooled to room temperature to crystallize orange crystals decomposing at 220° C.

Analysis.—Calc'd for $C_{13}H_{10}O_4N_4$: C, 54.55; H, 3.52; N, 19.58. Found: C, 54.91; H, 3.73; N, 19.60.

U.V. spectrum: $\lambda_{max.}^{EtOH}$ 277 m$\mu$ (log $\epsilon$ 4.34); 405 m$\mu$ (log $\epsilon$ 4.18); 530 m$\mu$ (log $\epsilon$ 4.30); 562 m$\mu$ (log $\epsilon$ 4.28)

EXAMPLE 12

2-Isonicotinoylhydrazino-5-Nitrosotropone 1-Methyl Nitrate

The procedure of Example 11 is repeated except that 900 mg. of isonicotinic acid hydride 1-methyl nitrate is used instead of isonicotinic acid hydrazide N-oxide to obtain 400 mg. of yellow microcrystals decomposing at 189–190° C.

Analysis.—Calc'd for $C_{14}H_{13}O_6N_5$: C, 48.42; H, 3.77; N, 20.17. Found: C, 48.13; H, 3.87; N, 19.86.

U.V. spectrum: $\lambda_{max.}^{EtOH}$ 269 m$\mu$ (log $\epsilon$ 4.33); 412 m$\mu$ (log $\epsilon$ 3.95); 550 m$\mu$ (log $\epsilon$ 4.25); 583 m$\mu$ (log $\epsilon$ 4.16) shoulder

EXAMPLE 13

2-(5-Nitro-2-Furoyl) Hydrazino-5-Nitrosotropone

To a hot solution of 300 mg. of 5-nitrosotropolone in 40 ml. of methanol is added a solution of 350 mg. of 5-nitro-3-furancarboxylic acid hydrazide dissolved in 13 ml. of 75% aqueous methanol and the mixture is boiled on water bath for 10 minutes. After completion of the reaction, the reaction mixture is cooled to room temperature and the crystals thus obtained are recrystallized from 73% aqueous solution to obtain orange needles melting at 243–244° C. (with decomposition).

Analysis.—Calc'd for $C_{12}H_8O_6N_4$: C, 47.37; H, 2.65; N, 18.42. Found: C, 47.36; H, 2.67; N, 18.26.

U.V. spectrum: $\lambda_{max.}^{EtOH}$ 291 m$\mu$ (log $\epsilon$ 4.25); 400 m$\mu$ (log $\epsilon$ 4.23); 540 m$\mu$ (log $\epsilon$ 3.86); 570 m$\mu$ (log $\epsilon$ 3.81) shoulder

EXAMPLE 14

2-(2-Indolylcarbonyl) Hydrazino-5-Nitrosotropone

To a hot solution of 600 mg. of 5-nitrosotropolone in 60 ml. of methanol is added a solution of 790 mg. of indole-2-carboxylic acid hydrazide dissolved in 80 ml. of methanol and the mixture is boiled on a water bath for 10 minutes. After completion of the reaction, the reaction mixture is concentrated under reduced pressure to a volume of 50 ml., and then the separated crystals are recrystallized from aqueous pyridine to obtain 610 mg. of reddish orange microcrystals decomposing at 234–235° C.

Analysis.—Calc'd for $C_{16}H_{12}O_3N_4$: C, 62.33; H, 3.92; N, 18.18. Found: C, 62.67; H, 4.06; N, 17.89.

U.V. spectrum: $\lambda_{max.}^{EtOH}$ 234 m$\mu$ (log $\epsilon$ 4.34) shoulder; 285 m$\mu$ (log $\epsilon$ 4.30); 430 m$\mu$ (log $\epsilon$ 4.36)

EXAMPLE 15

2-Formylhydrazino-5-Nitrosotropone

To a hot solution of 300 mg. of 5-nitrosotropolone in 30 ml. of ethanol is added a solution of 234 mg. of formic acid hydrazide dissolved in 10 ml. of water and the mixture is boiled on a water bath for 15 minutes. After completion of the reaction, the reaction mixture is concentrated under reduced pressure and the crystals thus obtained are recrystallized from 40% aqueous ethanol to produce 200 mg. of yellowish brown needles decomposing at 210° C.

Analysis.—Calc'd for $C_8H_7O_3N_3$: C, 49.74; H, 3.65; N, 21.76. Found: C, 49.87; H, 3.71; N, 21.70.

U.V. spectrum: $\lambda_{max.}^{EtOH}$ 270 m$\mu$ (log $\epsilon$ 4.16); 378 m$\mu$ (log $\epsilon$ 4.19)

EXAMPLE 16

2-Acetylhydrazino-5-Nitrosotropone

The procedure of Example 15 is repeated except that 170 mg. of acetic acid hydrazide is used instead of formic acid hydrazide. The resulting product is recrystallized from 50% aqueous ethanol to obtain 160 mg. of yellow needles decomposing at 185° C.

Analysis.—Calc'd for $C_9H_9O_3N_3$: C, 52.17; H, 4.38; N, 20.28. Found: C, 51.93; H, 4.45; N, 20.72.

EXAMPLE 17

2-n-Butyroylhydrazino-5-Nitrosotropone

The procedure of Example 15 is repeated except that 230 mg. of n-butyric acid hydrazide is used instead of formic acid hydrazide. The product thus obtained is recrystallized from 60% aqueous ethanol to produce 100 mg. of yellow needles decomposing at 155° C.

Analysis.—Calc'd for $C_{11}H_{13}O_3N_3$: C, 56.16; H, 5.57; N, 17.86. Found: C, 56.67; H, 5.75; N, 17.69.

U.V. spectrum: $\lambda_{max.}^{EtOH}$ 275 m$\mu$ (log $\epsilon$ 4.11); 384 m$\mu$ (log $\epsilon$ 4.21)

EXAMPLE 18

2-iso-Valeroylhydrazino-5-Nitrosotropone

The procedure of Example 15 is repeated except that 250 mg. of iso-valeric acid hydrazide is used instead of formic acid hydrazide. The product thus produced is recrystallized from 40% aqueous ethanol to obtain 200 mg. of yellow needles melting at 167–168° C. (with decomposition).

Analysis.—Calc'd for $C_{12}H_{15}O_3N_3$: C, 57.82; H, 6.07; N, 16.86. Found: C, 57.77; H, 6.01; N, 16.99.

EXAMPLE 19

2-n-Octanoylhydrazino-5-Nitrosotropone

The procedure of Example 15 is repeated except that 350 mg. of n-octanoic acid hydrazide is used instead of formic acid hydrazide. The product thus produced is recrystallized from 50% aqueous ethanol to obtain 270 mg. of yellow scaly crystals melting at 143–144° C. (with decomposition).

Analysis.—Calc'd for $C_{15}H_{21}O_3N_3$: C, 61.84; H, 7.27; N, 14.42. Found: C, 62.10; H, 7.59; N, 14.95.

EXAMPLE 20

2-n-Nonanoylhydrazino-5-Nitrosotropone

The procedure of Example 15 is repeated except that 380 mg. of n-nonanoic acid hydrazide is used instead of formic acid hydrazide. The product thus produced is recrystallized from 70% aqueous ethanol to obtain 400 mg. of yellow microcrystals decomposing at 115° C.

Analysis.—Calc'd for $C_{16}H_{23}O_3N_3$: C, 62.93; H, 7.59; N, 13.76. Found: C, 62.85; H, 7.56; N, 13.70.

U.V. spectrum: $\lambda_{max.}^{EtOH}$ 266 m$\mu$ (log $\epsilon$ 4.15); 384 m$\mu$ (log $\epsilon$ 4.21)

EXAMPLE 21

2-Phenoxyacetylhydrazino-5-Nitrosotropone

To a hot solution of 300 mg. of 5-nitrosotropolone in 30 ml. of ethanol is added a solution of 345 mg. of phenoxyacetic acid hydrazide dissolved in 10 ml. of ethanol and the mixture is boiled on a water bath for 10 minutes. After completion of the reaction, the reaction mixture is concentrated under reduced pressure and the crystals separated are recrystallized from aqueous dioxane to obtain 160 mg. of yellow needles melting at 205–206° C. (with decomposition).

Analysis.—Calc'd for $C_{15}H_{13}O_4N_3$: C, 60.19; H, 4.38; N, 14.04. Found: C, 60.05; H, 4.45; N, 14.11.

U.V. spectrum: $\lambda_{max}^{EtOH}$ 268 m$\mu$ (log $\epsilon$ 4.15); 274 m$\mu$ (log $\epsilon$ 4.14); 383 m$\mu$ (log $\epsilon$ 4.24)

EXAMPLE 22

*2-Lactoylhydrazino-5-Nitrosotropone*

The procedure of Example 21 is repeated except that 300 mg. of lactic acid hydrazide is used instead of phenoxyacetic acid hydrazide. The product thus produced is recrystallized from 40% aqueous ethanol to obtain 100 mg. of yellow microcrystals decomposing at 183° C.

Analysis.—Calc'd for $C_{10}H_{11}O_4N_3$: C, 50.63; H, 4.67; N, 17.72. Found: C, 50.53; H, 4.88; N, 17.98.

We claim:
1. A compound having the formula

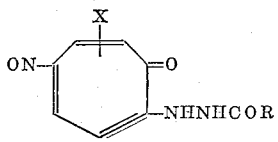

wherein X is a member selected from the group consisting of hydrogen, halogen, lower alkyl, lower alkoxy and phenyl and R is a member selected from the group consisting of 2-, 3- and 4-pyridyl, 4-pyridyl 1-oxide, 4-pyridyl 1-methyl nitrate and pyrazinyl.
2. 2-isonicotinoylhydrazino-5-nitrosotropone.
3. 2-isonicotinoylhydrazino-5-nitrosotropone N-oxide.
4. A process for preparing a compound having the formula

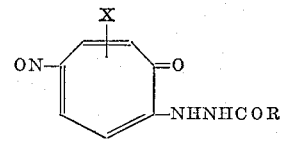

wherein X is a member selected from the group consisting of hydrogen, halogen, lower alkyl, lower alkoxy and phenyl and R is a member selected from the group consisting of 2-, 3- and 4-pyridyl, 4-pyridyl 1-oxide, 4-pyridyl 1-methyl nitrate and pyrazinyl, comprises reacting a compound having the formula

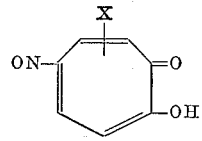

wherein X has the same meanings as described above with a compound having the formula $$NH_2-NH-COR$$

wherein R has the same meanings as described above.
5. Process for preparing 2-isonicotinoylhydrazino-5-nitrosotropone which comprises reacting 5-nitrosotropolone with isonicotinic acid hydrazide.
6. Process for preparing 2-isonicotinoylhydrazino-5-nitrosotropone N-oxide which comprises reacting 5-nitrosotropolone with isonicotinic acid hydrazide N-oxide.

No references cited.